Figure 3:
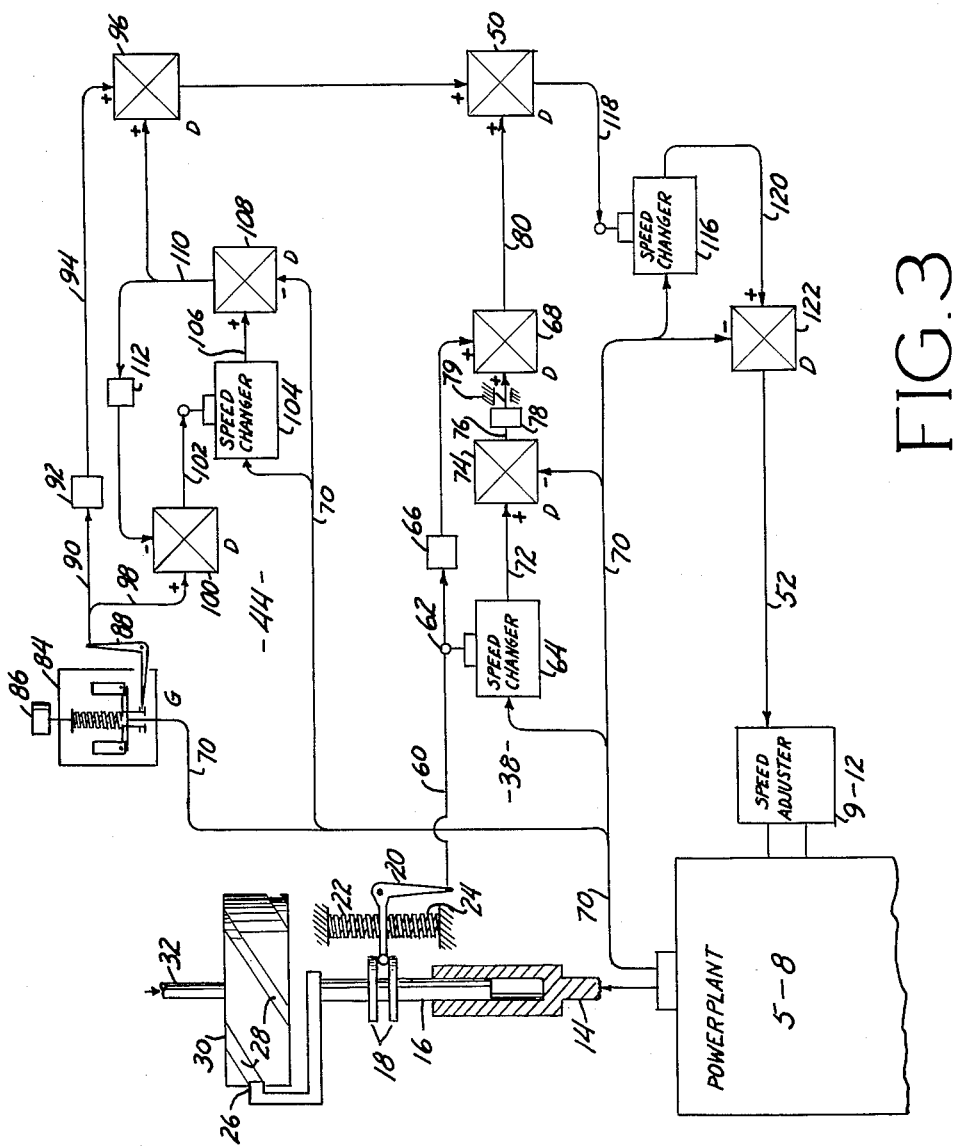

Aug. 7, 1962 C. W. CHILLSON 3,048,743
MULTI-POWER PLANT SYNCHRONIZING SYSTEM
Filed March 6, 1957 2 Sheets-Sheet 1
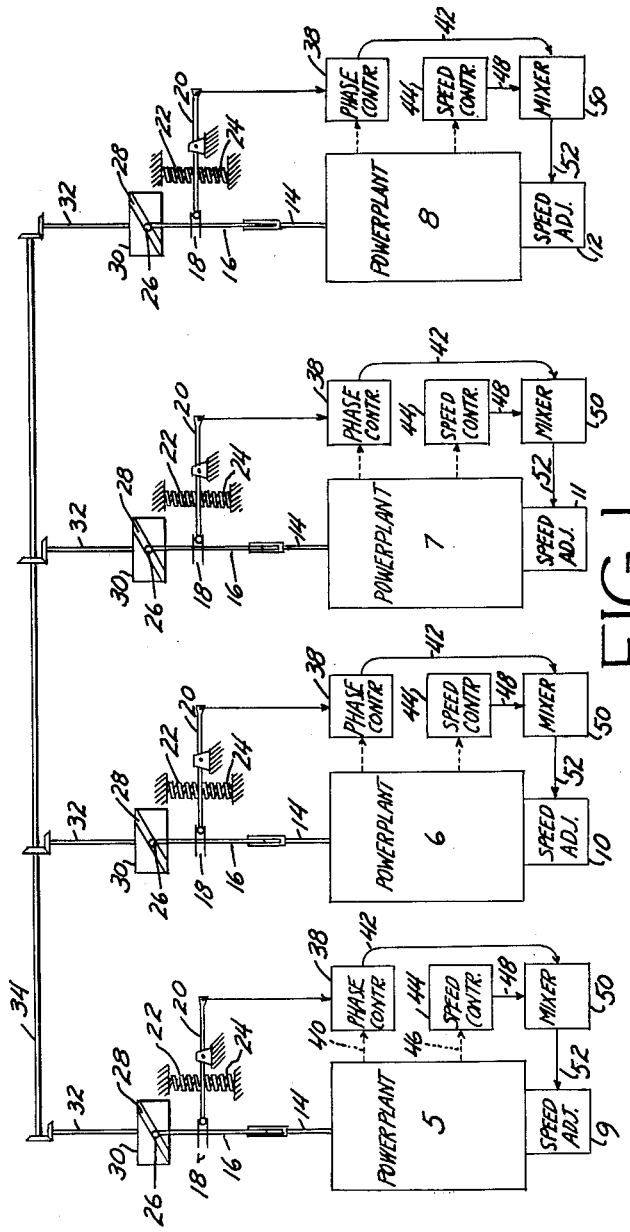
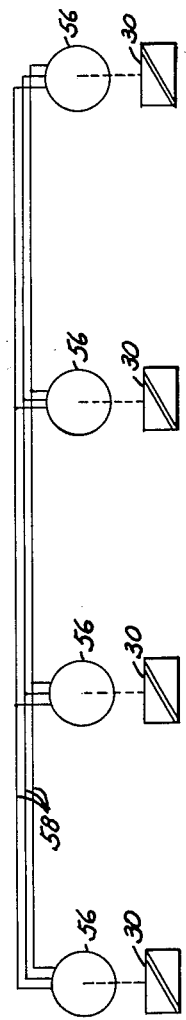
INVENTOR.
CHARLES W. CHILLSON
BY *Godfrey B. Speir*
ATTORNEY ＃ 3,048,743
MULTI-POWER PLANT SYNCHRONIZING SYSTEM
Charles W. Chillson, Packanack Lake, N.J., assignor to Curtiss-Wright Corporation, a corporation of Delaware
Filed Mar. 6, 1957, Ser. No. 644,315
10 Claims. (Cl. 317—6)

This invention relates to synchronization of a plurality of power plants or prime movers, each of which is equipped with its own adjustable speed regulator or adjuster.

The invention enables the speed and phase control of several power plants by the operation of the control system, the speed adjustment of the power plants being obtained by any suitable speed regulating instrumentality. The system is particularly applicable to aircraft power plants driving propellers wherein the propellers may be used, as is conventional, for controlling power plant speed through adjustment of the blade pitch angles. However, speed regulation of the power plants may be secured by controlling the fuel input to them or by other arrangements known in the art.

In respect to phase synchronization, the object is to control the power plants so that the blades of the several propellers maintain substantially the same or a predetermined angular relation with each other during propeller rotation. As is now known, phase synchronization enables a reduction in vibration and noise developed within an aircraft cabin and has an advantage in stress reduction in some parts of the aircraft structure resulting from minimization of forcing impulses which may be resonant with the vibration periods of aircraft structural components or assemblies.

An object of the present invention is to provide separate, adjustable speed controls for each of a plurality of power plants which, when set to substantially the same speed, will cause the power plants to run in speed synchronism. The control system is also provided with means by which the power plants are caused to run in phase synchronism as well as speed synchronism, at such times as speed error transients for any one power plant are within a predetermined limit. This synchronization is secured through interlinking of several power plants with one another so that when any one power plant departs from speed or phase synchronism relative to the others, a control load will not only be imposed on the asynchronous power plant control to cause that power plant to correct its speed and phase, but will also trim the control of the other power plants in the direction of the erring power plant so that they will be corrected in the direction of the error of the power plant which has become asynchronous.

A further object of the invention is to secure the results indicated by wholly mechanical instrumentalities, which have the virtue of great ruggedness. Another object is to provide a control system which is fail-safe in character so that should trouble arise in the synchronizing system each power plant may be controlled by its own individual system to operate at any governed speed within the desired operating speed range. Another object of the invention is to provide a speed and phase synchronizing arrangement which is wholly automatic in its operation. Another object of the invention is to provide a limited phase control command in each power plant and a system wherein phase synchronization may be brought into being quickly.

Further objects of the invention will become apparent as the specification proceeds.

An understanding of the invention may be secured by reading the attached detailed description in connection with the drawings wherein similar reference characters indicate similar parts and wherein:

FIG. 1 is a diagram of the control system of the invention in one embodiment applied to a plurality of power plants, FIG. 2 is a diagram of an alternative mode of interconnecting several power plants for speed and phase synchronization and, FIG. 3 is a diagram of the control system for any one of several power plants including, schematically, the instrumentalities which are employed.

As has been explained in co-pending Clark, Jr. patent application Serial Number 649,216, filed March 28, 1957, (now Patent No. 2,847,617) and in other patents and applications referred to therein, stable speed control of a power plant may be secured by combining the instant speed error with the time integral of the instant speed error to provide a control movement of a magnitude to regulate the power plant to an on-speed condition.

Further, in said prior applications, it has been explained that a phase error is proportional to the time integral of speed error, and that a double time integral of phase error is necessary to provide a positive phase correction for the system when the latter depends upon one reference for speed and upon another reference for phase. The phase reference becomes the absolute reference for speed and phase and operates as a trimmer on the other speed reference so that several systems may be held in synchronization. As implied in the introductory remarks, the phase and final speed synchronization between the power plants may be applied according to the errors between the power plants themselves and without respect to a positive speed reference so long as the power plants operate reasonably close to synchronism.

In FIG. 1, I show four power plants designated 5, 6, 7 and 8 each equipped with a speed adjuster, the speed adjusters being designated 9, 10, 11 and 12. These speed adjusters may be of any desired sort such as controllable pitch propellers, throttling regulators or the like. Each power plant is provided with a shaft 14 driven by the power plant at a speed proportional thereto. This shaft is keyed to a shaft, the shafts rotating together but being capable of relative axial movement. Shaft 16 carries discs 18 or the like which engage the ball end of a lever 20, the lever being rockable about its axis accordingly as the shaft 16 moves axially. The lever 20 is urged to a central position by springs 22 and 24. Shaft 16 carries a follower 26 which at times engages in one or another of sloped grooves 28 formed in the surface of cylinder 30. The cylinder is driven by a shaft 32, gear-connected to a shaft 34.

The shaft 34 serves the cylinders 30 of all power plants so that all of the cylinders 30 are driven in unison. When the power plants 5—8 are in phase and speed synchronism, all of the followers 26 will occupy the central position shown of the grooves 28 so that each power plant drives its own cylinder 30 at its own speed. Should any one power plant, say power plant 5, change from the other three in speed or phase relationship, the cylinder 30 will rotate relative to shaft 14 and the shaft 16 and the follower 26 will be forced to rise or descend in groove 28. This will cause the lever 20 to tilt against springs 22 and 24 and will, as will be described, exert a control effort upon the power plant tending to restore its speed and phase. However, as the follower 26 departs from the center of the groove 28 the springs 22 or 24 load the cylinder 30 torsionally tending to change its speed, along with the speed of the other cylinders 30, in the direction of speed or phase change which has been taken by power plant 5. This change will be reflected in the other drums 30 of power plants 6, 7 and 8 so that their followers 26 will move in grooves 28, rocking levers 20 in the opposite direction from that of power plant 5 to produce a control effect in the opposite direction on power plants 6, 7 and 8. This change of followers 26 is resisted by springs 22 or 24. Since there are three of these springs acting to hold the average speed of the system at the desired level, the influence of the off-phase or speed of power plant 5 would be only one-third of the influence of the other power plants to sustain phase or speed. Through this arrangement, power plant 5 will be given a larger control effort to restore its phase and speed while power plants 6, 7 and 8 would each be given a minor control effort to correct their phase and speed toward the phase or speed of power plant 5.

Thus, as any one power plant tends to differ from the average phase or speed of the others, the speeds of all power plants will be slightly readjusted and modified. This is most desirable in respect to phase control as it is immaterial what the reference point for phase may be so long as it is uniform for the four power plants. The phase control of the invention is insensitive to disturbances affecting all power plants simultaneously, but is sensitive to differential disturbances between them. Arrangements of the sort described eliminate the need for setting up any one power plant as a master phase reference and further eliminates the need for utilization of a separate phase reference system. The use of a separate or absolute phase reference is undesirable since it either makes phase synchronization dependent upon the perfect operation of the master power plant or on the perfect operation of the separate phase reference machine.

The length of each groove 28 and its cylinder 30 determines the limit of control for the phase and speed trimming system. In the case of a power plant driving a three-bladed propeller, each cylinder 30 would have three grooves 28. If any one power plant is drastically off speed, the follower 26 will run out of its groove 28 and ride along the top or bottom surface of the cylinder while the drastic off speed exists. Then the power plant operates independently of the trimming system. When the power plant approaches a speed which is close to that of the other power plants, a groove 28 will pick up the follower 26 from either end of the cylinder 30 depending on whether the power plant led or lagged the others. The follower 26, when out of its central position, will exert control effort in the power plant control system, and the other power plants will be trimmed toward the error of the subject power plant as previously described. Finally, the control exerted on all power plants by displaced springs 22 and 24 will bring the power plant to the on-speed, on-phase condition restoring steady state operation. In the instances just mentioned where three-bladed propellers are used, the follower 26 may pick up any one of three grooves 28 in cylinder 30 so that on-phase operation will be urged for that blade of the propeller which is nearest to the on-phase condition at the instance when control effort is applied with a follower 26 engaged in a groove 28. One, or any suitable number of grooves 28 may be employed, and provision may be made for adjusting cylinders 30 relative to each other for phase relation adjustment between power plants.

In FIG. 1, I show each lever 20 with an operating connection to a phase control unit 38. This may require power input from a connection 40 to the power plant, and each unit 38 has a control output 42. The speed control for each power plant is shown generally at 44, this, too, having a power take-off 46 from the power plant and also having a control output 48. The two control outputs 42 and 48 are combined in a mixer or summing differential 50. Output 52 from mixer 50 actuates the speed adjuster 9 (or, respectively, the speed adjusters 10 or 11 or 12).

FIG. 2 shows an arrangement which is alternative to the shaft 34 of FIG. 1 and the drives to the cylinders 30. Herein each cylinder 30 is drivably connected to the rotor of a polyphase synchronous alternating current machine 56, the several machines 56 being interconnected by conductors 58. The machines 56 are of synchronous type so that their motors will always rotate in unison. Also, they are of that type wherein they may be motors or generators accordingly as their electrical phase relation lags or leads with respect to the frequency existing in the conductors 58. If all cylinders 30 are being driven in unison by their power plants, the machines 56 will be in perfect phase with one another and will neither generate nor take power from the conductors 58. If any one machine 56, however, tends to lead or lag the frequency in the conductors 58, either driven or driving torque will be produced which influences the other machines 56 and which also influences the cylinders 30 to produce torque between them and the followers 26, thereby to produce control efforts in the power plant control system as previously described. These machines 56 are small, low-power control devices, as they transmit only small amounts of power.

A tuned network, adjustable if desired, may be connected to the conductors 58 to provide an auxiliary speed reference. If power plant speed departs from the speed consonant with the frequency of the tuned circuit, the power plant will be urged back to the speed. But the flexibility of the system as described remains unimpaired.

Reference may now be made to FIG. 3 which shows suitable elements of the control system for any one power plant. Differentials are shown as squares with crossed lines, representing gear or lever devices of known form having an output positioned according to the sum or difference of two input positions. The lever 20, the associated springs arrangements and driving devices will be recognized by the similarity in reference characters to like elements in FIG. 1. The cylinders 30, the groove 28 and the follower 26 comprise a limited-range differential, and the lever 20 is positioned in accordance with the time integral of the speed error of the power plant which is equal to the phase error of the power plant. Therefore, it may be considered that the position of the lever 20 is established by the phase error. The resulting phase error signal is directed through connection 60 to the controller 62 of a speed changer 64, thence through a ratio device 66 to a summing differential 68.

Speed changer 64 is driven from the power plant by a connection 70 and has an output element 72 leading to a subtracting differential 74. The speed changer 64 is similar in type to that shown in said prior Clark, Jr., application and, when the ratio adjuster 62 thereof is neutral, the rotation of the output 72 will be the same as the rotation of the input 70. When the adjuster 62 departs from neutral, the rotation of element 72 is greater or less than the rotation of the input 70, the difference representing the time integral of the position of the input 62. The subtracting differential 74 is inserted which has an input from the power plant speed take-off 70, whereby the output 76 of the differential 74 will at all times have a position which is the time integral of the phase error introduced at the speed changer input 62 without respect to rotations of 72 or 70. The position of element 76 is modified by a ratio changer 78 and is introduced into the summing differential 68. The output of the differential 68 at 80 will be positioned then according to the sum of the phase error plus the time integrated phase error, modified as to sensitivity by the ratio devices 68 and 78. This output 80 may also be stated as being the sum of the integrated speed error and the double integrated speed error with respect to the reference speed of the element 32. Other sorts of integrating mechanisms may be substituted for devices 64 and 74, to provide a desired time-integrated signal at 76. The output 80 is introduced to a summing differential 50. The elements 62—78 jointly constitute the phase control 38 shown in FIG. 1 and the output element 80 corresponds to the connection 42 shown in FIG. 1.

The independent stabilized speed control system represented by 44 in FIG. 1 may be comprised of the following elements of FIG. 3 now to be described. A governor 84 is driven by the element 70 at a speed proportional to power plant speed and may include an adjuster 86 for selection of the speed level at which the power plant is to be operated. The output of the governor 84 comprises an element 88 which is positioned according to the instant speed error of the power plant from the desired speed established by the setting of the governor adjuster 86. The lever 88 positions an element 90 driving a ratio device 92 and thence an element 94 comprising one input of a summing differential 96. The governor output 88 also is connected by an element 98 to one input of a subtracting differential 100. An output 102 of the differential 100 strokes the adjuster of a speed changer 104 of the same type as the speed changer 64, the speed changer having a power input from the element 70. The output of the speed changer 104, at 106 comprises one input to a subtracting differential 108, the other input of which is taken from the element 70. The output of differential 108 at 110 feeds the second input of the differential 96 and also feeds back through a ratio device 112, to the other input and the differential 100. The elements 100—104, 108 and 112, with the output 110, constitute what might be termed a time decrementer wherein, in effect, the position of the output 110 is the differential with respect to time of the speed error derived from the governor 84 at the element 98. The inputs to the summing differential 96 then comprise a direct function of speed error and a differential function of the speed error whereby the output from the differential 96 is the sum of these two functions. This "decrementer" may be comprised of other mechanisms than those shown at 100, 104 and 108 but these are convenient and practical for delineating principles of operation.

The output of differential 96 is directed by an element 114 to the summing differential 50 whose other output is the element 80 from the phase trimming control. The output from the differential 50 is then comprised by four functions; namely, the differential function of the speed error and the direct function of speed error with respect to governor reference speed, plus the integrated function of speed error and the double integrated function of speed error with respect to the phase and speed trimming reference.

Since it is desired to stroke the speed adjuster 9 an amount necessary to correct the speed and phase error with minimum over-shoot or under-shoot, it is necessary to time-integrate the output of differential 50. This is accomplished by an integrator comprising the speed changer 116 adjusted by the output 118 from differential 50 and supplied with power from the element 70. The output of the speed changer 116 at 120 includes the integral of the four functions above mentioned plus engine speed which latter term is subtracted out by a subtracting differential 122 whose inputs are the elements 70 and 120. The output of the differential 122 comprises the connection 52 shown in FIG. 1 whose position at any time represents the required adjustment of the speed adjuster 9 to restore the power plant to an on-speed, on-phase condition.

The system diagrammed in FIG. 3 represents a practicable solution to the phase and speed control problem and, as previously implied, may be constituted from all-mechanical positive components of known form and design. In the actual embodiment of a control system according to the invention, the several mechanical devices of the control system are coupled and combined, preferably into a unit package of small mass and bulk. It is considered to be within the realm of one skilled in the art, after understanding my invention, to use and design any appropriate kind and combination of mechanical speed changers, differentials and measuring devices, while still producing control functions for phase and speed control according to the principles of the invention.

Various changes and modifications may be made in the invention described without departing from the spirit or scope thereof and I aim, in the following claims, to cover all proper modifications and variations in the invention.

I claim:

1. A speed equalizing system for a plurality of substantially similar, independently operable power plants, each having a speed regulating mechanism, comprising a differential for each power plant, each differential having a first input element driven by its associated power plant, each differential having another input element and an output element, means coupling said other input elements together for joint rotation, each first input element being variable in phase relation to the others, elastic means operatively connected with each differential and exerting a control effect upon differential movement of the input and output elements of the associated differential for transmission through the coupling means to the other differentials, and means connecting the output element of each differential to the speed regulating mechanism of the corresponding power plant.

2. A speed equalizing system for a plurality of substantially similar, independently operable power plants, each having a speed regulating mechanism, comprising a differential for each power plant, each differential having a first input element driven by its associated power plant, each differential having another input element and an output element, means coupling said other input elements together for joint rotation, each first input element being variable in phase relation to the others, elastic means operatively connected with each differential and exerting a control effect upon differential movement of the input and output elements of the associated differential for transmission through the coupling means to the other differentials, and means connecting the output element of each differential to the speed regulating mechanism of the corresponding power plant, the differentials each including means whereby the said control effect increases the torsional drag on the coupling means upon speed increase thereof and decreases the torsional drag thereon upon speed decrease thereof.

3. A speed equalizing system for a plurality of substantially similar, independently operable power plants, each having a speed regulating mechanism, comprising a differential for each power plant, each differential having a first input element driven by its associated power plant, each differential having another input element and an output element, means coupling said other input elements together for joint rotation, each first input element being variable in phase relation to the others, elastic means operatively connected with each differential and exerting a control effect upon differential movement of the input and output elements of the associated differential for transmission through the coupling means to the other differentials, and means connecting the output element of each differential to the speed regulating mechanism of the corresponding power plant, said coupling means comprising a synchronous A.-C. alternator driven by each associated differential input element, and means electrically connecting said alternators in parallel.

4. In a multiple power plant control system, a synchronous alternator driven by each power plant, means connecting said alternators in parallel electrically, a differential in the driving connection between each power plant and its alternator whereby each power plant drives its alternator through the differential, and means responsive to the operation of the differential to regulate the speed of the associated power plant.

5. In a multiple power plant control system, a synchronous alternator driven by each power plant, means connecting said alternators in parallel electrically, a differential in the driving connection between each power plant and its alternator whereby each power plant drives its alternator through the differential, and means responsive to the operation of the differential to regulate the speed of the associated power plant, at least one of said power plants including a governor to establish a desired speed therefor and hence for said several power plants.

6. In a power plant control system, a synchronous alternator driven by the power plant, a bus system energized at substantially constant frequency to which the output of said alternator is connected, a variable load driven by the power plant, the drive torque from said power plant to said alternator varying as power plant speed may vary from a speed equivalent to said constant frequency, a differential in the drive connection from said power plant to said alternator whereby each power plant drives its alternator through the differential, and means actuated by said differential in response to torque variations sensed thereby to change said variable load.

7. Apparatus for synchronizing a plurality of power plants wherein each power plant has a speed controller, a differential for each power plant, each having an input element driven by the respective power plant, a second element for each differential connected to corresponding second elements of other differentials for rotation therewith, a third element on each differential connected to operate the speed controller of the corresponding power plant, the connections between said second elements of said differentials comprising alternators drivably connected to each said second element for rotation by the associated power plant, and parallel electrical connections between the several alternators.

8. A speed and phase synchronizing control system for a plurality of power plants, each having a stabilized adjustable speed governor and each having a speed adjuster, comprising a plurality of rotors, one for each power plant, coupled together for joint rotation, a differential drive connection between each power plant and its rotor, said connection including resilient means urging each said rotor toward rotation with its power plant, each differential drive including a member movable in response to off-phase of its power plant relative to said rotors, means responsive to movement of each said movable member to compute the time integral of the movement thereof, and means to mix the time integrated movement of each said movable member with the output of each respective said governor, and means to apply each mixed signal to actuate the speed adjuster of the respective power plant.

9. In combination with a plurality of power plants each having a speed regulator, speed controlling means operable to adjust respective regulators to cause respective power plants to operate at a desired speed, a trimming differential in the drive train of said speed control means to each regulator, a light drive connection between said several power plants, a differential at each power plant each having an input element in driving relation with said connection and an input element in driving relation with the respective power plant, each said differential having an output element, each said output element operating according to the phase error between its power plant and said connection, means to limit the action of said output element to a desired maximum correctible phase error, resilient means urging said output element to a predeterminned position corresponding to zero phase error attitude, and means actuated by said output element to insert the error dwelling therein to said trimming differential.

10. In combination with a plurality of power plants each having a speed regulator, speed controlling means operable to adjust respective regulators to cause respective power plants to operate at a desired speed, a trimming differential in the drive train of said speed control means to each regulator, an A.C. machine driven by each power plant at a speed proportional thereto, said A.C. machines being electrically interconnected whereby each thereof runs with the others at leading, lagging or neutral relationship depending upon the speed and phase of the leading power plants relative to the speed and phase of lagging power plants, means to compare the output mechanical speed and the phase output of each A.C. machine with the speed and phase output of the related power plant productive of an error signal, means to limit the magnitude of said signal and means connecting said comparing means to said trimming differential to impose the error signal on the speed regulator of the related power plant.

References Cited in the file of this patent

UNITED STATES PATENTS

| | | |
|---|---|---|
| 2,221,112 | Schmidt | Nov. 12, 1940 |
| 2,381,250 | Baumann | Aug. 7, 1945 |
| 2,413,028 | McCoy | Dec. 24, 1946 |
| 2,431,687 | Drake | Dec. 2, 1947 |
| 2,543,077 | Treseder | Feb. 27, 1951 |
| 2,670,157 | Peterson | Feb. 23, 1954 |